(12) United States Patent
Setina

(10) Patent No.: US 7,726,688 B2
(45) Date of Patent: Jun. 1, 2010

(54) VEHICLE PARTITION COMPATIBLE WITH SIDE AIR BAGS

(76) Inventor: Terry L. Setina, 2442 Island Dr. NW., Olympia, WA (US) 98502-9750

( * ) Notice: Subject to any disclaimer, the term of this patent is extended or adjusted under 35 U.S.C. 154(b) by 371 days.

(21) Appl. No.: 11/640,098

(22) Filed: Dec. 14, 2006

(65) Prior Publication Data
US 2007/0176450 A1    Aug. 2, 2007

Related U.S. Application Data

(60) Provisional application No. 60/750,710, filed on Dec. 14, 2005.

(51) Int. Cl.
*B60R 21/12* (2006.01)
(52) U.S. Cl. .................. 280/748; 296/24.42; 280/730.2
(58) Field of Classification Search .................. 280/748, 280/749; 296/24.42
See application file for complete search history.

(56) References Cited

U.S. PATENT DOCUMENTS

| | | | | |
|---|---|---|---|---|
| 3,666,313 A | * | 5/1972 | Halstead et al. .......... | 296/24.46 |
| RE27,942 E | * | 3/1974 | Setina ...................... | 296/24.42 |
| 4,015,875 A | * | 4/1977 | Setina ...................... | 296/24.46 |
| 4,035,014 A | * | 7/1977 | Sellers ..................... | 296/24.46 |
| 4,173,369 A | * | 11/1979 | Roggin .................... | 296/24.46 |
| 4,595,227 A | * | 6/1986 | Setina ...................... | 296/24.46 |
| 4,964,666 A | * | 10/1990 | Dillon ...................... | 296/24.46 |
| 4,971,378 A | * | 11/1990 | Setina ...................... | 296/24.46 |
| 5,536,057 A | * | 7/1996 | Stewart .................... | 296/24.46 |
| 7,195,297 B2 | * | 3/2007 | Murray et al. ............. | 296/24.4 |
| 7,380,853 B2 | * | 6/2008 | Wells ....................... | 296/24.4 |

* cited by examiner

*Primary Examiner*—Paul N Dickson
*Assistant Examiner*—Nicole Verley
(74) *Attorney, Agent, or Firm*—Klarquist Sparkman, LLP

(57) ABSTRACT

A vehicle partition for separating front and rear occupant areas (or other restricted and permitted areas) in a vehicle having side air bags, the vehicle partition comprising a partition frame with upright portions spaced apart from the vehicle's respective inner side surfaces such that the partition does not interfere with deployment of the air bags. In some embodiments, access through openings defined by the spaced apart upright portions and adjacent vehicle side surfaces is restricted by cover members. In some embodiments, one or more portions of the partition frame are electrified to shock an occupant in a restricted area attempting to gain access to a permitted area through an opening in the partition.

19 Claims, 9 Drawing Sheets

VEHICLE PARTITION COMPATIBLE WITH SIDE AIR BAGS

CROSS REFERENCE TO RELATED APPLICATION

This application claims the benefit of U.S. Provisional Patent Application No. 60/750,710, filed Dec. 14, 2005, which is hereby incorporated by reference.

FIELD

This application relates to motor vehicles, and particularly to partitions for separating areas of a vehicle's interior.

BACKGROUND

Vehicle partitions separating front and rear areas of a vehicle, such as in a law enforcement vehicle or a taxi cab, are known. Vehicle partitions are used in an effort to reduce the possibility that a rear seat occupant will harm or interfere with a front seat occupant, e.g., the driver of the vehicle.

Some partitions separate areas of the rear seat, e.g., into left and right areas, such that two persons can be separated from each other or a law enforcement dog can be separated from a person.

Many vehicles typically used in law enforcement are now equipped with side air bags. One category of side air bags is designed to reduce the risk of injury to an occupant's head and/or neck in the event of an accident. When triggered to deploy, these side air bags inflate to occupy spaces located generally along the inner side surfaces of the vehicle, including the side windows and frame members, in an effort to prevent or lessen injury from an occupant's impact with these surfaces.

There are side air bags that have a tubular shape when inflated, and others that are larger in size and loosely resemble a curtain window covering (referred to as "side curtain air bags"). Side curtain air bags for some vehicles can be designed to extend substantially the length of the interior, and particularly the length of the front and rear windows, when deployed. When viewed from either side of the vehicle, these side curtain air bags can extend from an area near the forward end of the front window rearward past the center pillar (usually the B-pillar, i.e., the portion of the body separating the front and rear windows), along the rear window and in some cases, beyond the rear window. Side curtain air bags are typically configured to deploy from the roof rail above the side windows. Other side air bags are deployed from the seats.

Conventional partitions have surrounding frames designed to fit closely to the sides and roof of the vehicles to reduce the chance that a rear seat occupant can reach around the partition with his hand or an implement. Proper functioning of side curtain air bags, however, requires unrestricted spaces opposite the windows to allow full inflation upon deployment.

It would be advantageous to provide a vehicle partition compatible with side air bags that still provides a measure of protection to front seat occupants. It would also be desirable to provide a sturdy partition mounting approach compatible with new vehicle interiors.

SUMMARY

Described below are embodiments of a new partition that overcomes some of the problems of conventional partitions.

According to some embodiments, a vehicle partition for separating front and rear occupant areas of a vehicle having side air bags comprises a partition frame with upright portions spaced apart from the vehicle's respective inner side surfaces such that the partition does not interfere with deployment of the air bags.

The partition can comprise at least one panel occupying a space between the frame and an adjacent inner side surface, the panel being configured to deform or to detach when the air bag is deployed.

The panel can be attached to the frame by a hinged connection, by hook and loop fasteners or any other suitable form of a connection.

The partition can comprise a bracket with upper and lower attachment points for attaching one side of the partition to one side of the vehicle, where the lower attachment is elevated above a level of the vehicle's floor. The partition can comprise a bracket for connection to the partition and having an upper attachment point for connection to the vehicle, where the bracket is positioned below a deployment zone of the respective side air bag.

The partition can have one or more electrified portions capable of shocking a person that contacts the partition in the area of the electrified portions.

The partition can comprise netting attached to the vehicle and/or the partition to restrict access to the front occupant area by an occupant in the rear occupant area through a space between the frame and an adjacent inner surface of the vehicle.

According to some embodiments, a vehicle partition for separating front and rear occupant areas of a vehicle having side air bags comprises a partition frame comprising upright portions spaced apart from the vehicle's respective inner side surfaces in deployment regions of the air bags and a lateral frame member. The lateral frame member extends between the upright portions and is positioned adjacent a ceiling of the vehicle. There are mounting points on the frame for mounting the frame to the vehicle, and the mounting points are positioned at heights above a floor of the vehicle.

The mounting points may comprise at least one upper mounting point and at least one lower mounting point for each respective side of the frame. The upper mounting point and the lower mounting point may be provided on a single bracket. The mounting points may be positioned at heights less than a height of a lower extent of the deployment regions of the air bags.

The upright portions may be positioned close to the vehicle's respective inner side surfaces at heights below a lower extent of the deployment regions of the air bags.

The partition may comprise at least one panel occupying a space between the frame and an adjacent inner side surface, the panel being configured to deform or to detach when the air bag is deployed.

According to some embodiments, a vehicle partition for separating front and rear occupant areas of a vehicle comprises a partition frame, electrodes mounted to the frame and a circuit that selectively allows the electrodes to be energized, wherein when the electrodes are energized, they are capable of shocking a person that contacts the frame to a shock.

The circuit can include a switch allowing power to the electrodes to be selectively turned on and turned off. The circuit can be powered by a vehicle battery or another source of power. The circuit can comprise a transformer that steps up the current supplied to the electrodes.

The partition can include a cover for the frame that fits over the electrodes mounted to the frame. The partition frame can be configured with uprights that are spaced apart from the vehicle's respective inner side surfaces in air bag deployment regions.

According to some implementations, a method of configuring a partition in a vehicle having side air bags comprises providing a partition sized to fit within an interior of the vehicle and to define a restricted occupant space on one side of the partition and a permitted occupant space on the other side of the partition, the partition being configured for attachment to the vehicle. The method also comprises determining dimensions of side air bag deployment zones within the interior, the deployment zones representing the size, shape and position of the respective air bags when inflated during a deployment. Further, the method comprises selectively shaping an outer periphery of the partition to fit closely to the interior of the vehicle, except in areas where the partition would intersect with the airbag deployment zones. In areas where the partition would intersect with airbag deployment zones, the method comprises providing open areas defined by the outer periphery of the partition and the adjacent portions of the vehicle interior, the open areas being sized to allow contact between deployed airbags and the partition but not impeding full inflation of the airbags. The method can comprise restricting access through the open areas from the restricted occupant space to the permitted occupant space to restrict an occupant in the restricted occupant space from gaining access to the permitted occupant space.

Restricting access through the open areas can comprise providing cover members that block access through at least a portion of the open areas. Restricting access through the open areas can comprise providing electrified portions adjacent to the open areas, the electrified portions being capable of emitting energy to shock a restricted space occupant attempting to gain access to the permitted space though one of the open areas.

DETAILED DESCRIPTION

Figure 1:
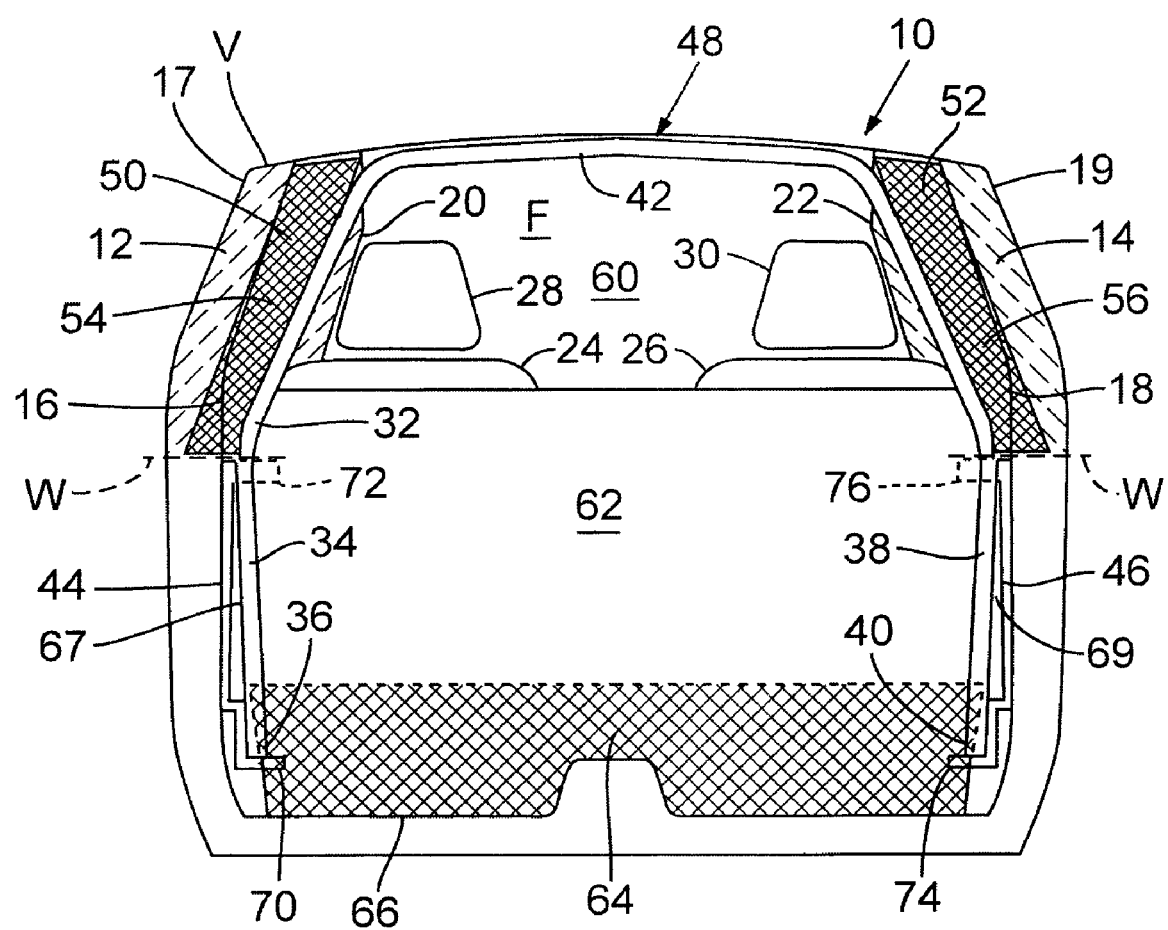
FIG. 1 is a transverse cross-section of a vehicle viewed from the rear and showing a partition separating the rear seat (not shown) from the front seat and deployment zones for the right and left side curtain airbags.

FIG. 1 is a transverse section of a typical vehicle V, viewed from the rear, showing an embodiment of a partition 10 installed to separate the front occupant area F of the vehicle interior from the rear occupant area R (not shown).

The vehicle V is equipped with left and right side curtain air bags 12, 14, which are deployed from longitudinally extending roof rails 17, 19 and inflate to fill the air bag deployment zones 20, 22 (shown in crosshatching), respectively, within the interior. In FIG. 1, the front occupant area F has left and right seats 24, 26 with headrests 28, 30, respectively. As shown, the air bag deployment zones 20, 22 extend laterally inward from the side surfaces of the vehicle approximately to the respective headrests 28, 30 (i.e., adjacent to normal positions of each occupant's head) in an effort to prevent injuries to occupants during an accident.

Figure 7:
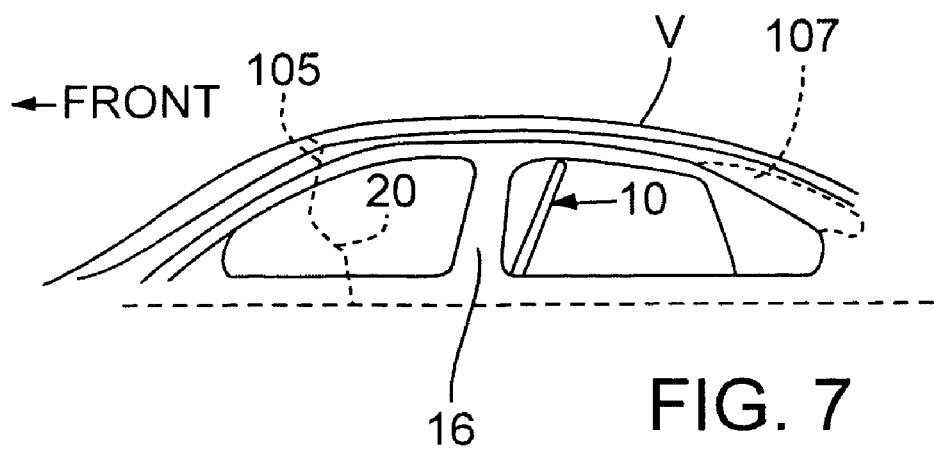
FIG. 7 is an elevation view of an exterior right side portion of the vehicle of FIG. 1 showing the relative positions of the partition and the deployment zone for the right side curtain air bag.

The longitudinal extent of the left air bag deployment zone 20 and the relative position of the partition 10 are shown schematically in FIG. 7. As shown in FIG. 7, the deployment zones can extend from the forward end of the interior (i.e., adjacent the A-pillar 105 of the vehicle), beyond a center pillar 16 (or B-pillar) separating the front and rear windows, and to the rear of the interior (i.e., adjacent the C-pillar 107). The left center pillar 16 and a right center pillar 18 are also shown in FIG. 1, with their upper portions being shown in dashed lines.

The partition 10 has an outer frame 32 comprised of a left upright portion 34 extending upwardly from a left end 36, a right upright portion 38 extending upwardly from a right end 40, and an upper lateral portion 42 extending between the upright portions 34, 38. A portion of the frame 32 may comprise a cover 100 (see, e.g., FIG. 8) made of a soft material, such as rubber. In the embodiment shown, the frame 32 is attached to the vehicle V by left and right side brackets 44, 46, which are described below in greater detail. The partition 10 has an upper panel 60, which can made of a clear material as shown, and a lower panel 62. Optionally, the partition 10 can have an extension panel 64 fitted below the lower panel 62, which can be configured, e.g., to extend approximately to the floor 66 as shown.

The frame 32 is configured to fit close to the vehicle's inner surfaces (e.g., in the area of the center pillars 16, 18 below the level W of the windows) and to the inner surface of the roof 48 (i.e., the headliner) in the area of the upper lateral member 42, but space is provided between portions of the frame 32 opposite the air bag deployment zones 20, 22 so that the partition 10 does not pose a substantial interference to the operation or the air bags. Thus, the frame 32 is spaced apart laterally from inner surfaces of the vehicle V above the level W of the windows. It should be noted that the partition 10 can occupy some portion of the air bag deployment zones 20, 22, such that the air bags 12, 14 contact the frame 32 when deployed, without impeding their inflation.

In the embodiment of FIG. 1, there are areas 50, 52 between the center pillars 16, 18 and the left and right upright portions 34, 38, respectively, that are normally unoccupied when the air bags are not deployed. Depending on the size of the areas 50, 52, it may be desirable to provide panels 54, 56, respectively, to cover at least portions of the areas without interfering with operation of the air bags. Covering the areas can help prevent a rear occupant from accessing the front area F. Depending on the particular configuration of the partition, covering the areas may also help to isolate sounds from traveling between the front occupant area F and the rear occupant area R.

Figure 8:
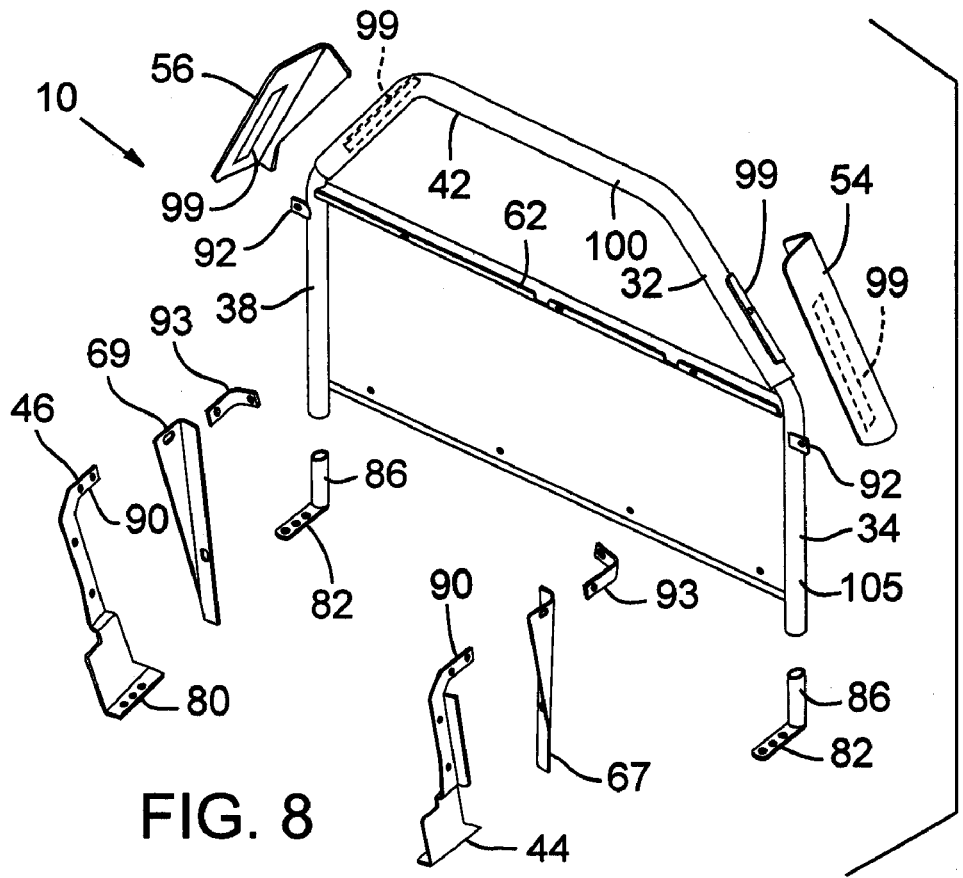
FIG. 8 is an exploded view of a partition with panels that are released from their attachments in response to deploying air bags.

According to one implementation, the panels 54, 56 comprise an elongate member with two generally flat portions arranged at an angle to each other. The panels 54, 56 have edges attached to the frame 32 (including the cover 100), e.g., in the regions of the upright portions 34, 38 above the window level W. In some implementations, such as is shown in FIG. 8, the panels 54, 56 are removably attached, such as with corresponding hook and loop fasteners 99 or other similar arrangement. The panels 54, 56 may also be attached to the vehicle side surfaces, e.g., to the pillars 16, 18, respectively, to the roof 48 and/or to other adjacent structure. In some implementations, the panels 54, 56 are described as "break away" panels in the way they separate from their attachments.

Figure 9:
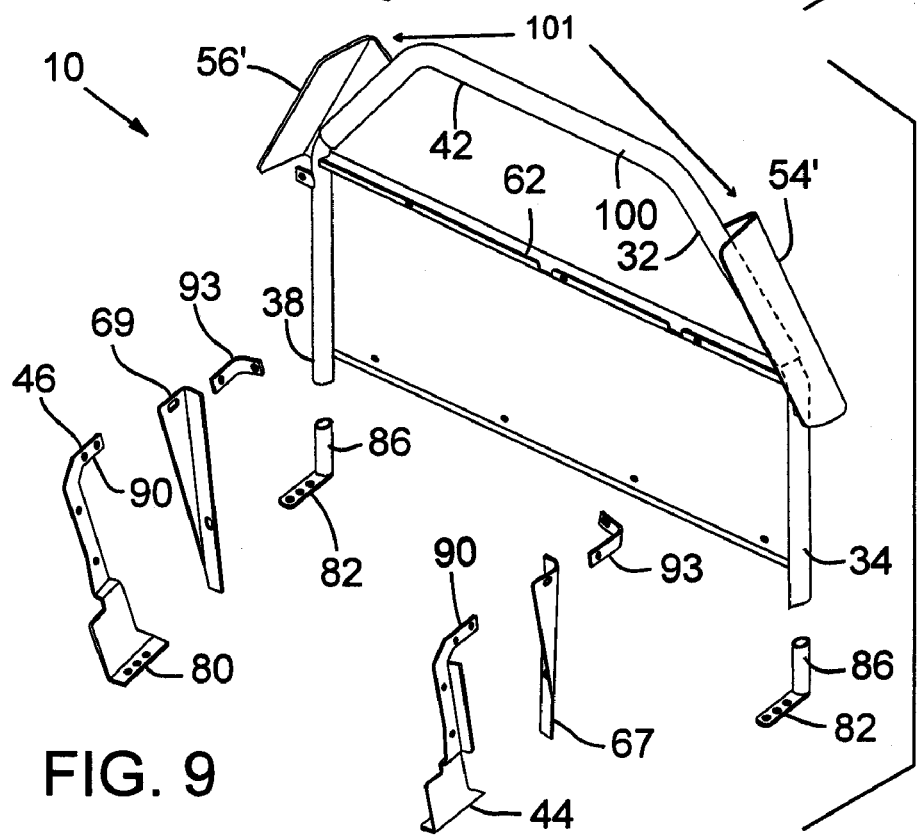
FIG. 9 is an exploded view of a partition with panels that deform or pivot away in response to deploying air bags.

According to other implementations, the panels deform in response to air bag deployment but remain attached. According to another implementation as shown in FIG. 9, panels 54', 56' are attached to the frame by hinges 101 and can "deform" or pivot out of the way in response to a deploying air bag. According to another implementation, the panels could be biased toward a normal position covering the spaces 50, 52 and could fold back or retract into slots in response to a deploying air bag.

The attachment or deformation force between the panels and the frame 32 is configured such that the inflating air bags 12, 14 can overcome this force and expand normally into the spaces 50, 52 without substantial interference.

Figure 2:
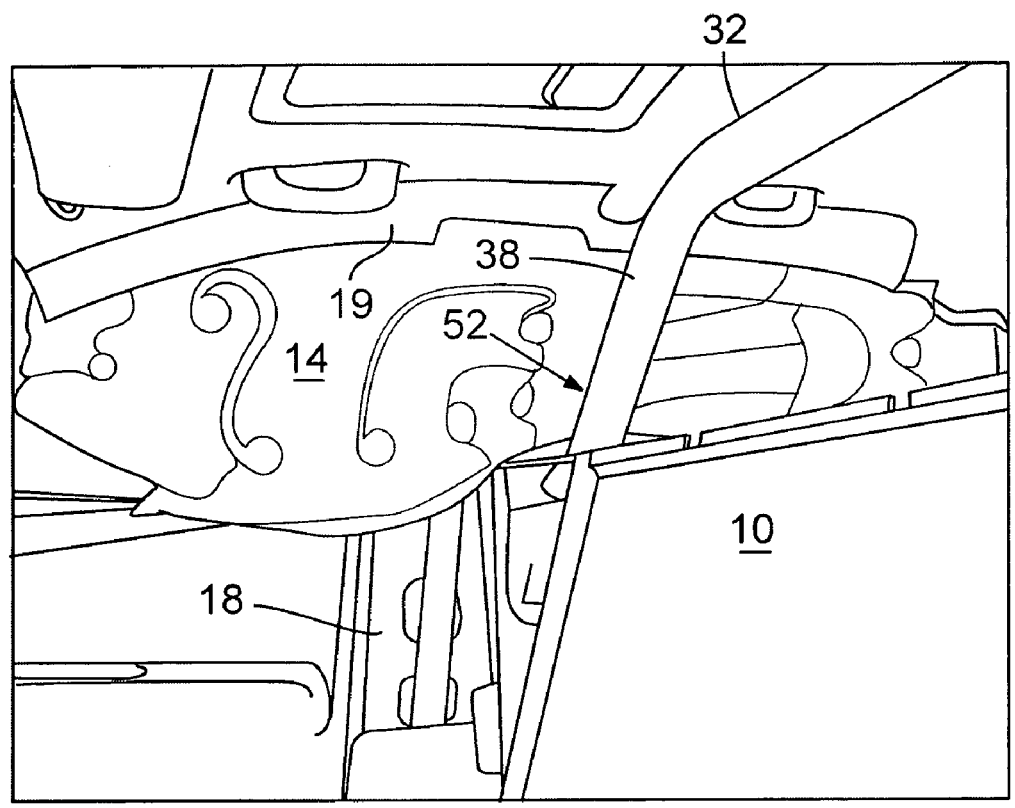
FIG. 2 is an elevation view showing the right side curtain airbag deployed within the interior as viewed from the driver's door.
Figure 3:
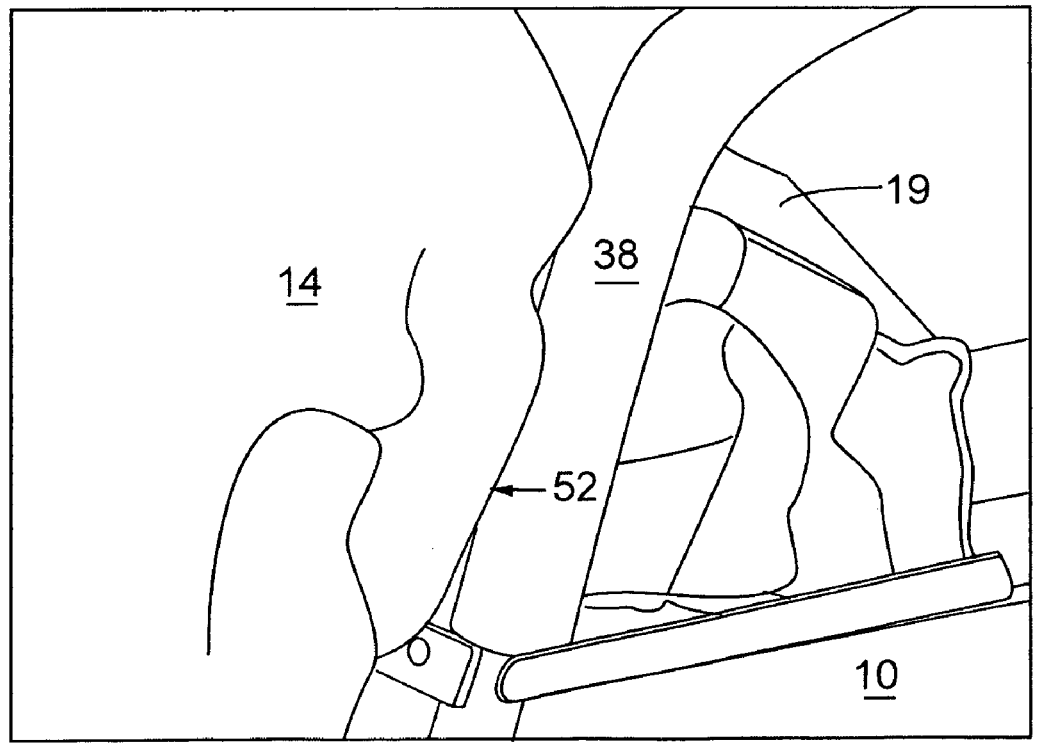
FIG. 3 is another elevation view showing the right side curtain airbag deployed within the interior.

FIG. 2 shows the right air bag 14 in its inflated state within the vehicle (with the front seats removed for clarity). Following initial deployment, the right air bag 14 expanded from its stored position in the roof rail 19, contacted the panel 56 (not shown) and urged it to separate or "break away" from the right upright portion 38 of the frame 10 as it expanded fully into the area 52 to the position shown. FIG. 3 shows the right upright portion 38 positioned to accommodate and fit closely with the expanded air bag 14.

In some implementations, the panels 54, 56 are made from a thin polycarbonate material. In some implementations, the panels 54, 56 are made from a transparent material to provide rear visibility for the front occupants. In addition to restricting a rear occupant's access to the front occupant area with his hands or an implement, the panels 54, 56 provide a measure of protection to the front occupant(s) against exposure to air and/or blood borne pathogens from a rear occupant. Optionally, filler panels 67, 69 can be provided to fill or cover gaps between the frame 32 and the vehicle's inner surfaces as shown in, e.g., as shown in FIG. 8.

As shown in FIG. 1, according to some implementations, the partition 10 can be attached to the vehicle V at four mounting points in the mid-vehicle region. For example, there can be left lower and left upper mounting points 70, 72, respectively, and right lower and right upper mounting points 74, 76, respectively. In some implementations, the left lower and right lower mounting points 70, 74, respectively, are elevated above the floor 66 of the vehicle. Thus, it is possible to attach the partition 10 to the vehicle V without requiring any floor-mounted or roof-mounted attachments.

Figure 4:
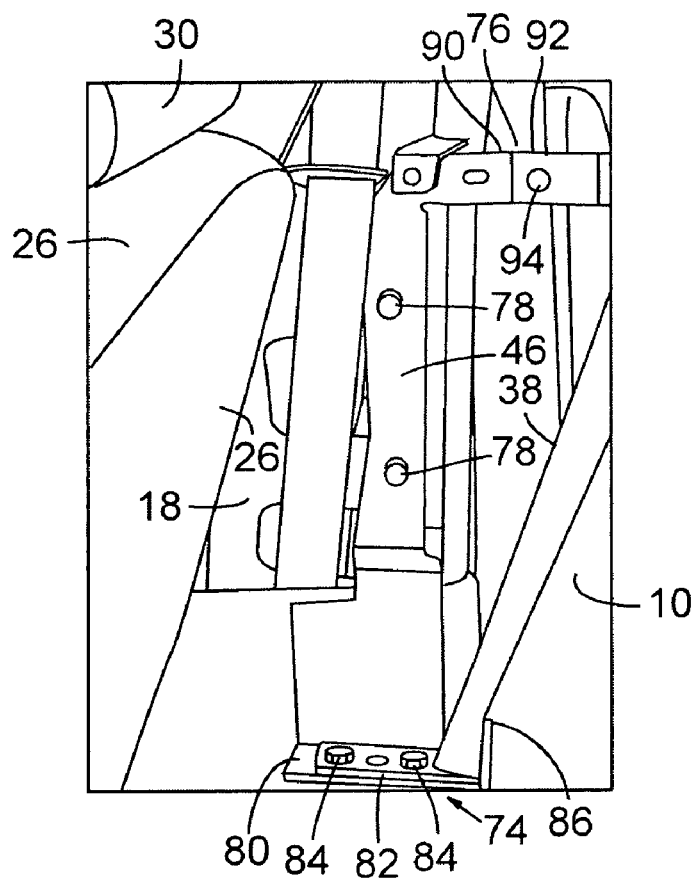
FIG. 4 is an elevation view of one embodiment of a right side bracket for attaching the partition to the vehicle.
Figure 5:
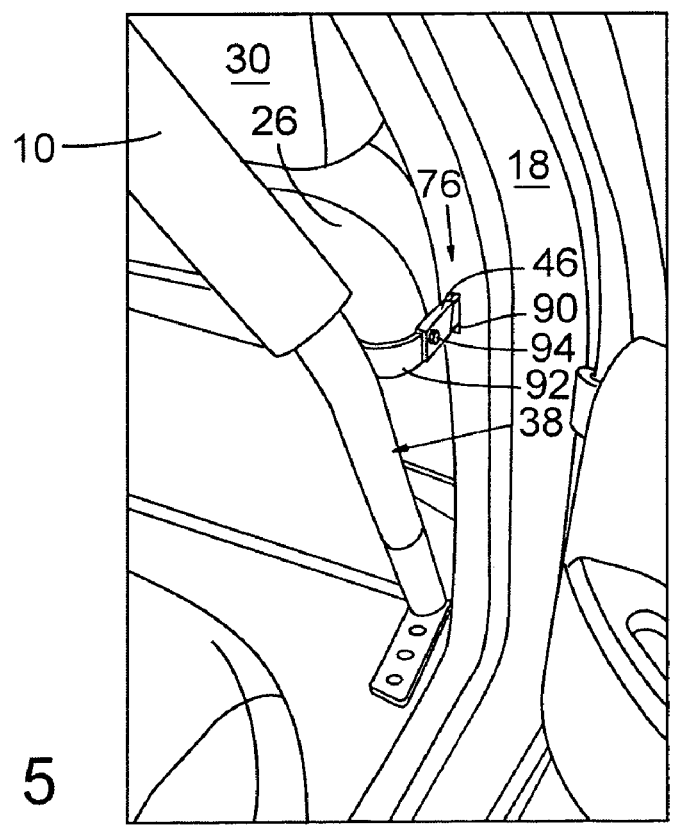
FIG. 5 is a perspective view of the right side of the partition and the right side bracket.

In FIG. 1, the bracket 44 provides the left lower and left upper mounting points 70, 72, respectively. Similarly, the right bracket 46 provides the right lower and right upper mounting points 74, 76, respectively. FIG. 4 shows a side elevation view of the right bracket 46 attached to the pillar 18 rearward of the seat 26 with fasteners 78. FIG. 5 is another view of the bracket 46, viewed through the open right rear door, with the trim panel reinstalled over the pillar 18.

A one-piece bracket having a substantial upright length mounted to a body pillar (such as the center pillar or B-pillar), e.g., the bracket 46, has advantages for securing the partition 10 in some modern vehicles having a unibody construction. In such vehicles, there may not be a floor member of sufficient strength in the area of the partition to which attachments can be made. Also, the bracket configuration can be selected such that the pillar and attached bracket is stronger than the pillar alone. In other implementations, multiple piece brackets can be used.

At a lower end of the bracket 46, there is a flange 80 with a series of holes and a separate stub mounting plate 82 attached to the flange 80 with fasteners 84 at two selected holes. The flange 80 and the mounting plate 82 allow the position of the lower edge of the partition 10 to be adjusted forward or rearward within the vehicle, e.g., to accommodate a desired position of the seat 26. At the rear end of the mounting plate 82, there is a stub 86 (see, e.g., FIG. 6) extending into the lower end of the right upright portion 38. At the upper end of the bracket 46, there is a projecting tab 90, which is attached to an angled bracket 93, which in turn is attached to an upper right mounting tab 92 of the partition by a fastener 94.

Other attachment and adjustment approaches are, of course, possible. For example, hinged attachment points could be used in certain implementations. In some implementations, the lower attachment points allow the partition to pivot over a slight range to allow front occupant seats to be moved rearwardly.

Figure 6:
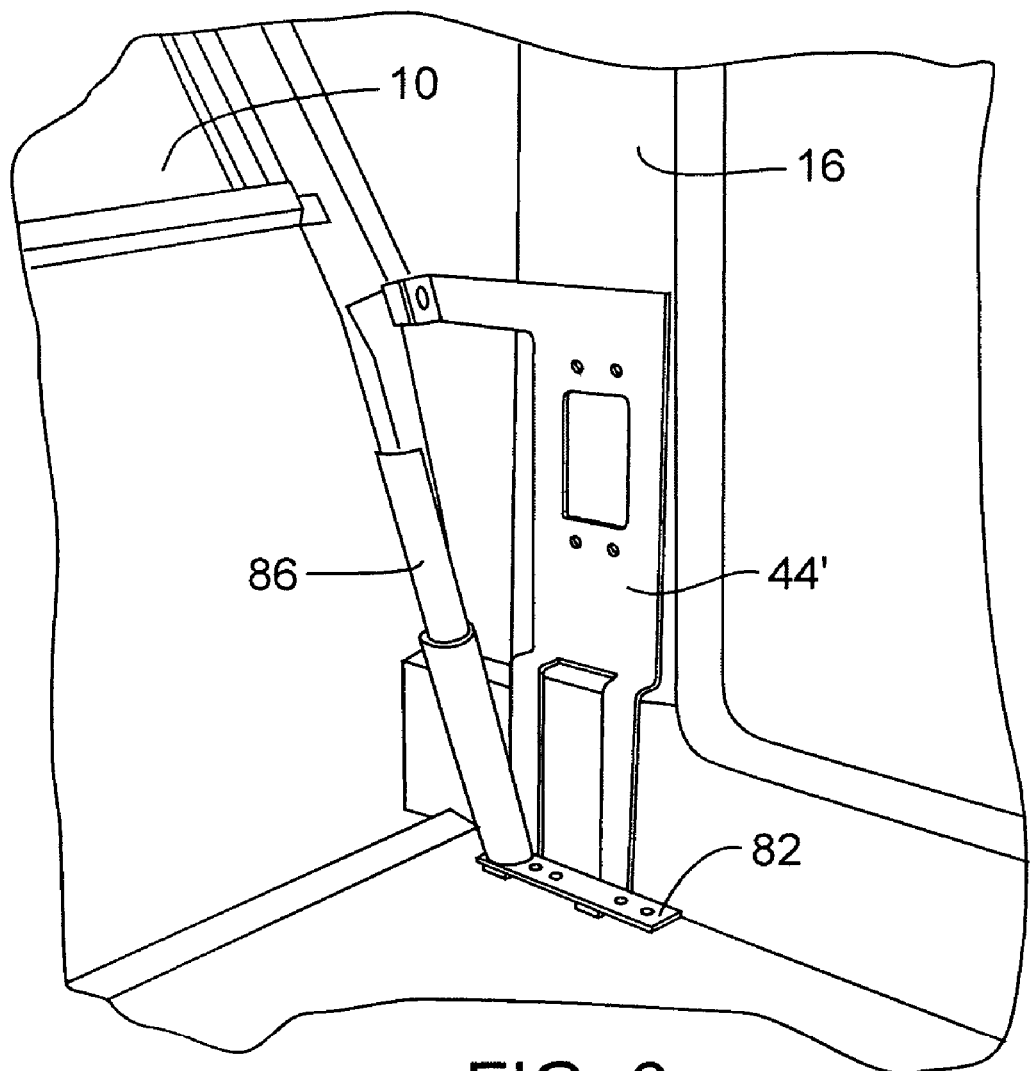
FIG. 6 is a schematic perspective view of an alternative bracket design, shown for a left bracket.

FIG. 6 is a schematic depiction of another bracket embodiment, in this case a left bracket 44' shown attached to the pillar 16. Similar to the bracket 46, the bracket 44' has a lower end with an attachment to the stub 86.

Figure 13:
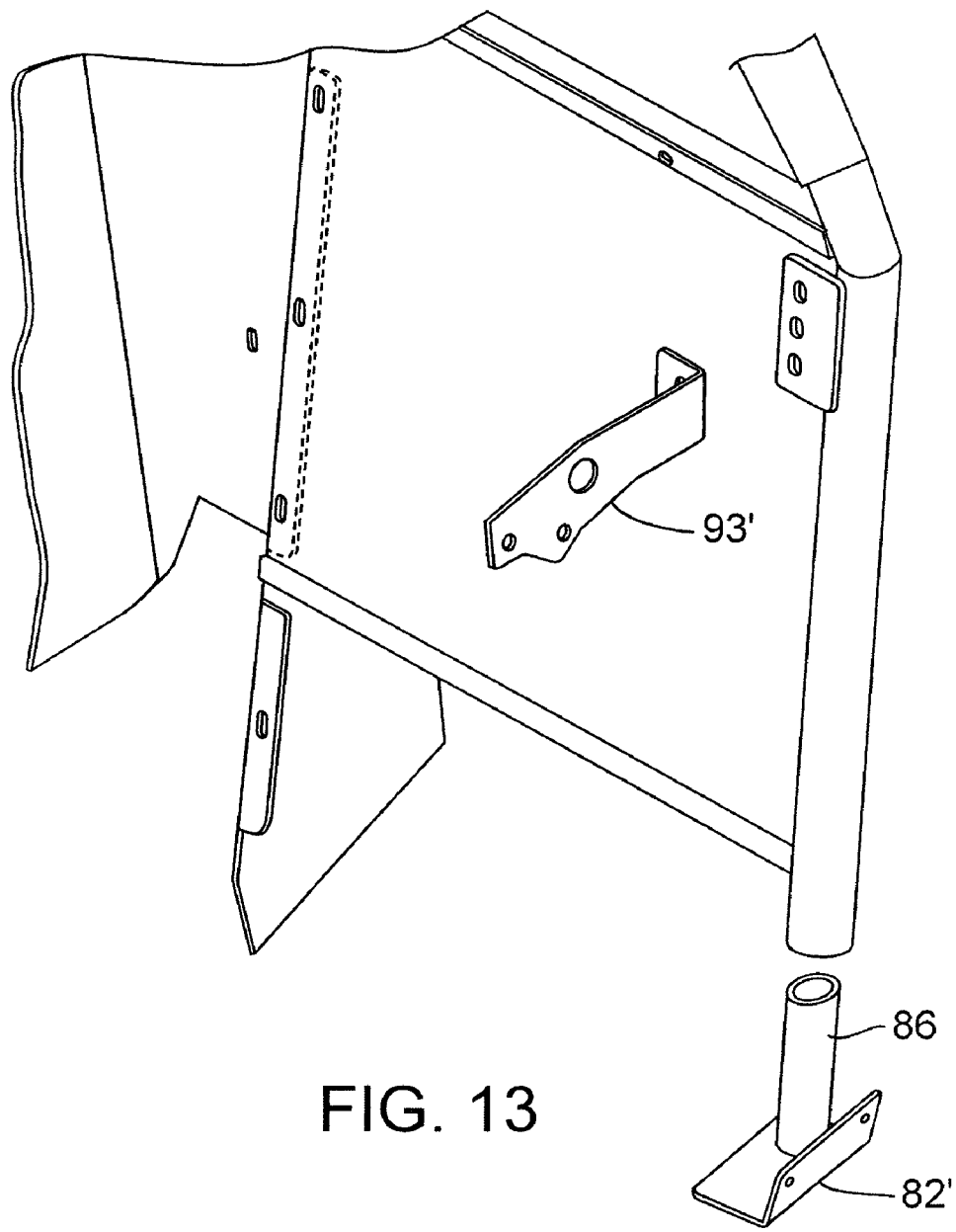
FIG. 13 is a perspective view of a portion of the partition showing an alternative mounting design.

FIG. 13 is a perspective view of a portion of a partition showing a variation of the angled bracket 93', which is also mounted at a height below the lower extent of the airbag deployment zone. FIG. 13 also shows the stub 86 and a variation of the mounting plate 82' having a flange with holes for side mounting.

Figure 10:
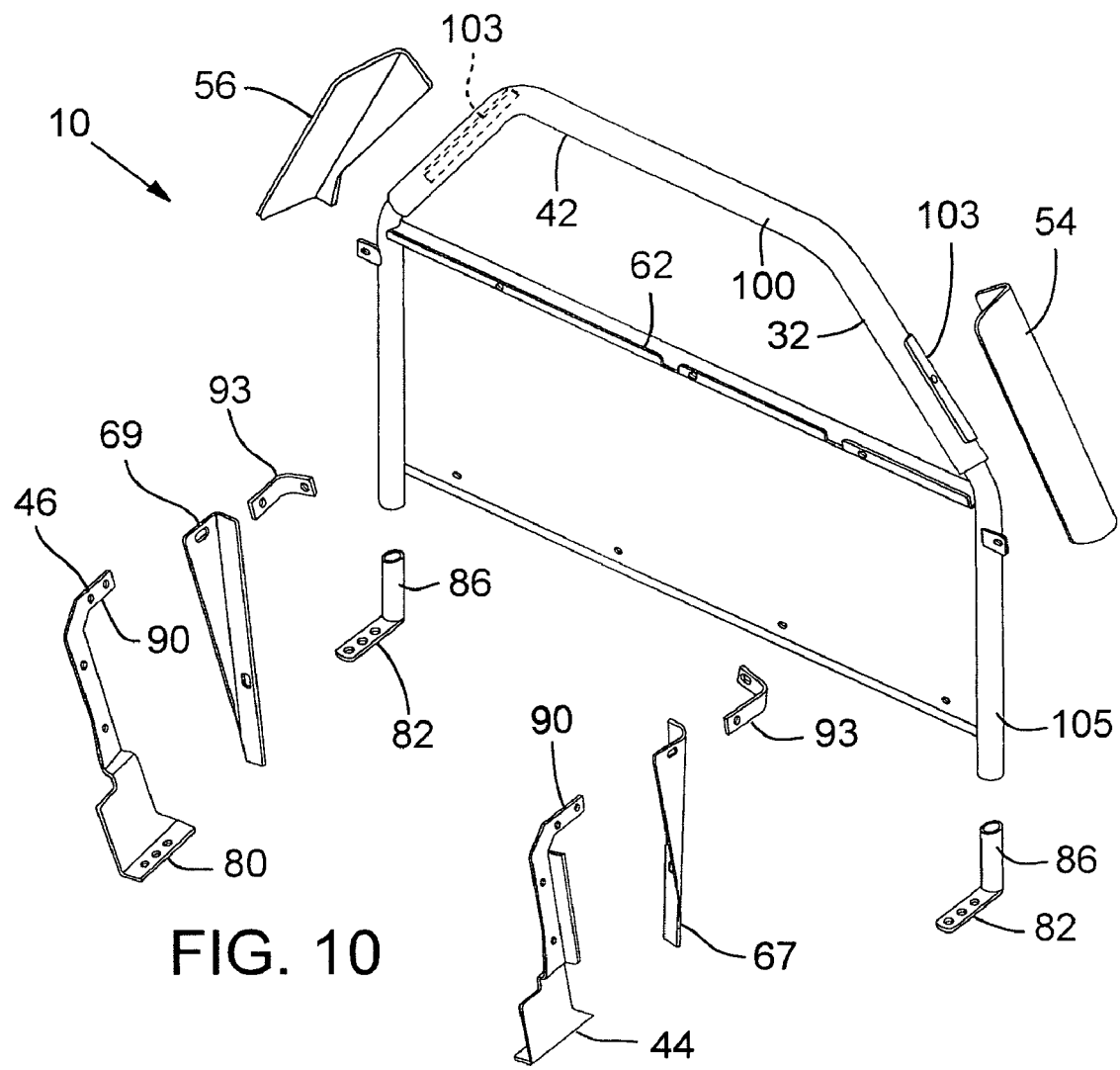
FIG. 10 is an exploded view of a partition having electrified portions.

According to another implementation, the partition is electrified in an effort to repel a rear occupant seeking to access the front occupant area F. In this way, the rear occupant is likely to receive a shock and desist in his efforts. As shown in FIG. 10, the frame 32 can be provided with one or more electrified portions 103 connected to a source of power (e.g., via the vehicle's electrical system or a separate dedicated power source) by wiring 105 and configured to shock an individual making contact with those portions. The electrified portions 103 may be strips of conductive material. Operation of the electrified portions 103 is preferably controllable from the front occupant area F. According to one variation, the electrified portions 103 can be energized to remain electrified for extended periods and to provide constant, passive protection while in operation. According to another variation, the electrified portions 103 are selectively energizable to create a shock in real time. The electrified portions 103 may pulse for one or more intervals before turning off after a predetermined duration. The level of shock given by the electrified portions 103 is adjustable according to the level of deterrence required.

Figure 11:
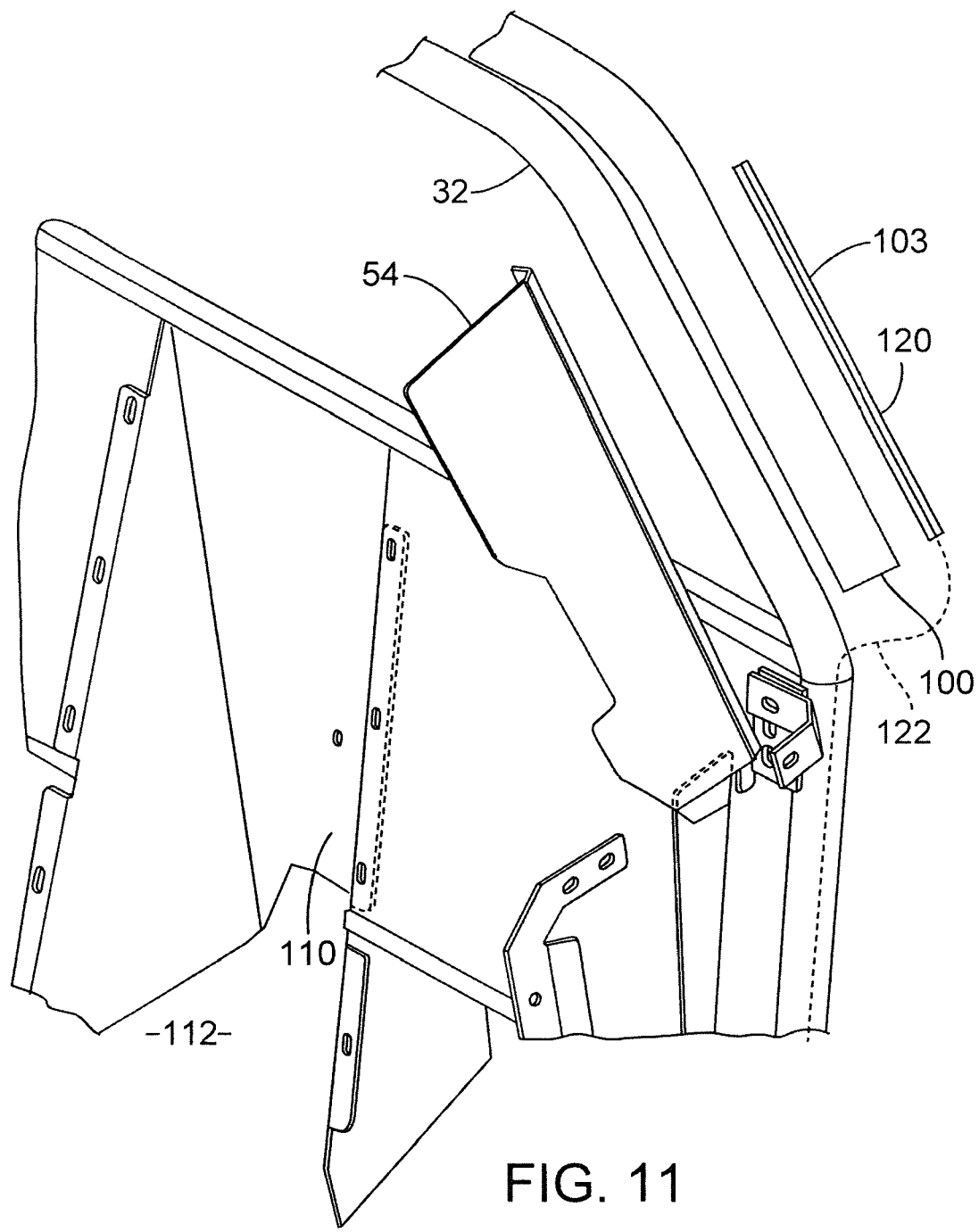
FIG. 11 is a perspective view of a portion of a partition having electrified portions.

FIG. 11 is a perspective view of a portion of a partition showing the configuration of the electrified portion 103 on the right side. It should be noted that this design of the partition includes a protruding portion 110 that protrudes from the general plane of the partition rearward toward the rear seat. The protected area 112 forward of the protruding portion 110 can be used for various purposes, including, e.g., providing secured storage for long arms.

Figure 12:
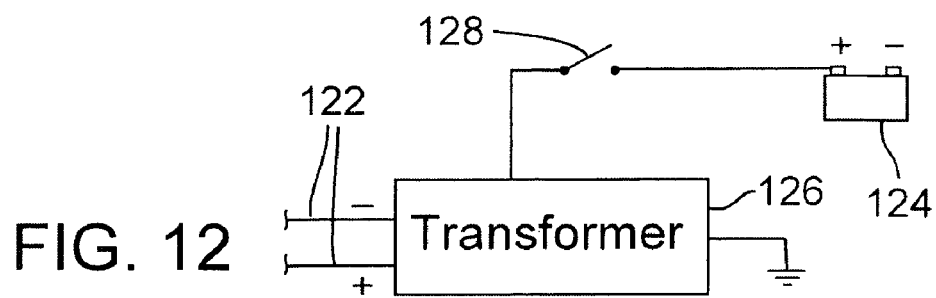
FIG. 12 is a schematic of a circuit for providing power to and controlling the electrified portions.

As shown in the embodiment of FIG. 11, the electrified portion 103 can comprise an electrode 120, which can be secured to the frame 32. In areas where the cover 100 extends, the cover 100 can be positioned to fit over the electrode 120. The electrode 120 is connected to a source of power by one or more conductors 122. As shown in FIG. 12, power can be provided to the electrode 120 via the conductor 122 from a DC power source 124, such as the vehicle's battery (which may be 12V or 22V), or by a separate dedicated power source. Current from the battery is stepped up by a transformer 126 to a level sufficient to deliver a repelling shock (through the cover 100, if provided), yet not injure the rear occupant or other person who contacts the electrode 120. The circuit can be controlled by a switch 128, which can be a simple on-off switch or may be integrated with other operations of the vehicle, such as to turn on automatically only when a sensor (not shown) shows the rear seat is occupied. It would also be possible to configure a manual override to permit the circuit to be turned off when desired.

Figure 14:
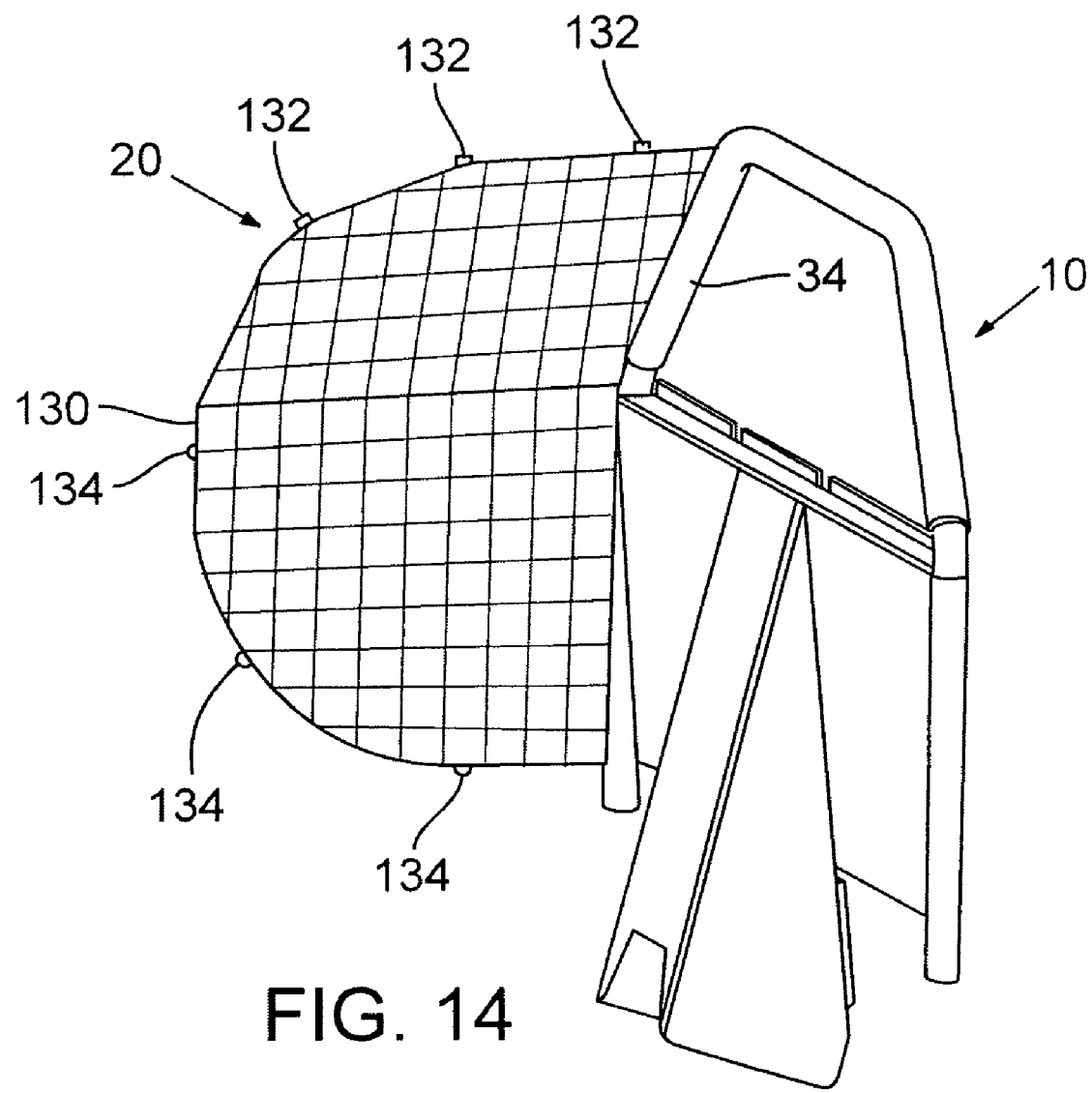
FIG. 14 is a perspective view of a partition having a netting portion.

FIG. 14 is a perspective view of a partition showing an alternative approach to impeding access through the open areas between the vehicle's inner side surfaces and the partition in the areas of the air bag deployment zones. In FIG. 14, the left side of the partition is shown fitted with netting, such NASCAR-style window netting 130, which extends generally front to rear. The netting 130 blocks the open area between the left upright portion 34 and the adjacent inner surface of the vehicle, thus impeding an occupant in the left rear seat from attempting to reach through the opening. The netting 130 can be attached to the partition and to the vehicle in any suitable manner, such as, e.g., with quick release fasteners 132 to the roof or headliner and the upright portion 34 along its upper edges, and with rings 134 to the door frame and rear seat area along its lower edges. The quick release fasteners are designed to break away in the event of an airbag deployment to prevent unrestricted inflation and operation of the air bag.

The components of the partition may be made of any suitable material. For example, the frame, lower panel and brackets are typically made of steel or other material. The panel 62 can be made, e.g., of LEXAN. The various smaller panels can be made, e.g., of a polycarbonate material.

In view of the many possible embodiments to which the disclosed principles may be applied, it should be recognized that the illustrated embodiments are only preferred examples and should not be taken as limiting in scope. Rather, the scope of protection is defined by the following claims. I therefore claim all that comes within the scope and spirit of these claims.

I claim:

1. A vehicle partition for separating front and rear occupant areas of a vehicle having side air bags, the vehicle partition comprising a partition frame with upright portions spaced apart from the vehicle's respective inner side surfaces such that the partition does not interfere with deployment of the airbags and at least one panel occupying a space between the frame and an adjacent inner side surface, the panel being configured to deform or to detach when the air bag is deployed.

2. The vehicle partition of claim 1, wherein the panel is attached to the frame by a hinged connection.

3. The vehicle partition of claim 1, wherein the panel is attached to the frame by hook and loop fasteners.

4. The vehicle partition of claim 1, further comprising a bracket with upper and lower attachment points for attaching one side of the partition to one side of the vehicle, wherein the lower attachment is elevated above a level of the vehicle's floor.

5. The vehicle partition of claim 1, wherein the partition has an electrified portion capable of shocking a person.

6. The vehicle partition of claim 5, wherein the electrified portion comprises electrodes mounted to the frame and a circuit that selectively allows the electrodes to be energized, wherein when the electrodes are energized, the electrodes are capable of shocking a user that contacts the frame.

7. The vehicle partition of claim 6, wherein the circuit includes a switch allowing power to the electrodes to be selectively turned on and turned off.

8. The vehicle partition of claim 6, further comprising a cover for the frame that fits over the electrodes mounted to the frame.

9. The vehicle partition of claim 6, wherein the circuit is powered by a vehicle battery.

10. The vehicle partition of claim 6, wherein the circuit comprises a transformer that steps up the current supplied to the electrodes.

11. The vehicle partition of claim 1, further comprising a bracket for connection to the partition and having an upper attachment point for connection to the vehicle, wherein the bracket is positioned below a deployment zone of the respective side air bag.

12. The vehicle partition of claim 1, further comprising netting attached to at least one of the vehicle and the partition to restrict access by an occupant in the rear occupant area through a space between the frame and an adjacent inner surface of the vehicle.

13. A vehicle partition for separating front and rear occupant areas of a vehicle having side air bags, the vehicle partition comprising:
a partition frame comprising upright portions spaced apart from the vehicle's respective inner side surfaces in deployment regions of the air bags;
a lateral frame member extending between the upright portions and positioned adjacent a ceiling of the vehicle;
mounting points on the frame for mounting the frame to the vehicle, wherein the mounting points are positioned at heights above a floor of the vehicle; and at least one panel occupying a space between the frame and an adjacent inner side surface, the panel being configured to deform or to detach when the air bag is deployed.

14. The vehicle partition of claim 13, wherein the mounting points comprise at least one upper mounting point and at least one lower mounting point for each respective side of the frame.

15. The vehicle partition of claim 14, wherein the upper mounting point and the lower mounting point are provided on a single bracket.

16. The vehicle partition of claim 13, wherein the mounting points are positioned at heights less than a height of a lower extent of the deployment regions of the air bags.

17. The vehicle partition of claim 13, wherein the upright portions are positioned close to the vehicle's respective inner side surfaces at heights below a lower extent of the deployment regions of the air bags.

18. The vehicle partition of claim 13, wherein the panel is attached to the frame by a hinged connection.

19. The vehicle partition of claim 13, wherein the panel is attached to the frame by hook and loop fasteners.

* * * * *